March 8, 1960     H. S. CARLSON     2,927,596
PORTABLE IRRIGATION SIPHON
Filed July 28, 1955

INVENTOR.
Harold S. Carlson
BY

United States Patent Office 2,927,596
Patented Mar. 8, 1960

2,927,596

PORTABLE IRRIGATION SIPHON

Harold S. Carlson, Othello, Wash.

Application July 28, 1955, Serial No. 524,943

2 Claims. (Cl. 137—146)

This invention is a portable irrigation siphon having novel means for filling the siphon to initiate the siphoning action.

It is a principal object of this invention to provide a portable irrigation siphon which may be easily filled with water to start the siphoning action.

Another object of the invention lies in the provision of a siphon tube so constructed that it may be filled with water to start the siphoning action without the operator having to get wet by immersing the siphon in the water.

Another object of the invention lies in the provision of a portable irrigation siphon which has a check valve at its ingress end to prevent back flow of water.

A still further object of the invention lies in the provision of a siphon having a check valve which has a curved portion specifically designed to be disposed in the flow area of the siphon and therefore to be very effective in moving to a closed position when the water therein attempts to go backwards.

These and other important objects of the invention will become apparent during the course of the following description, when taken in conjunction with the accompanying drawings wherein a preferred form of the invention is disclosed. It should be understood however that the drawings and description are illustrative only and are not intended to limit the invention beyond the scope set forth in the appended claims.

Referring now to the drawings wherein like numerals are employed to designate like parts;

Figure 1:
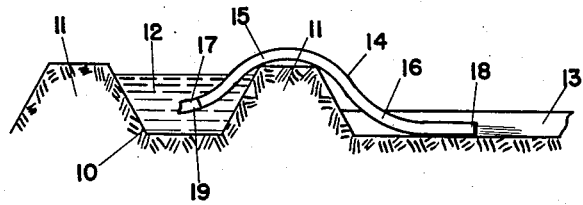
Figure 1 is a view partially in cross section taken through an irrigation ditch and showing in side elevation my improved portable irrigation siphon.
Figure 2:
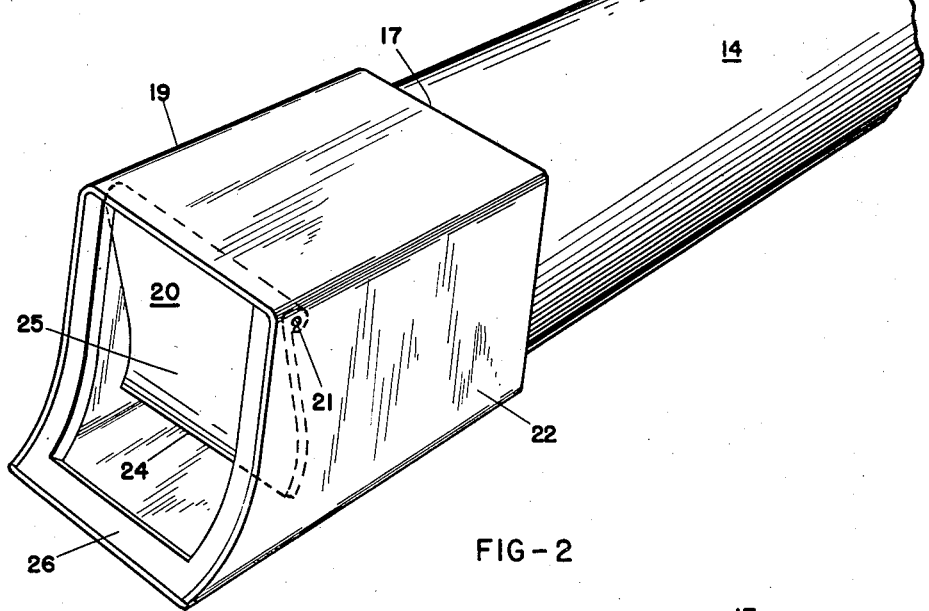
Figure 2 is an enlarged fragmentary perspective of the ingress end of the siphon constituting the subject matter of the present invention.

Referring now with greater particularity to the drawing it will be seen that I have disclosed an irrigation ditch 10 which is conventionally formed in the earth having two raised embankments 11—11 with the irrigation water 12 flowing therebetween.

When it is desired to admit the irrigation water to a desired irrigation trough 13 it is customary to employ a siphon tube to prevent erosion of the embankment 11. In the present day practice it is conventional to employ a plastic tube approximately 1¼ inches or more in internal diameter. To start the siphon action it is necessary to completely immerse the tube in the water 12 of the irrigation ditch 10 and after it is filled with water place the palm of the hand over the discharge end thereof while said discharge end is removed from the ditch and placed in the trough 13 taking care not to permit the ingress end of the tube to come out of the water of the ditch. More often it is necessary for the operator to kneel beside the ditch and after removing and placing a number of these siphons the operator finds himself thoroughly soaked with water and covered with mud.

In the present invention I provide preferably an inflexible tube 14 of any practical material which is provided with a radius bend at 15 and a reverse bend at 16 to enable the body of the siphon tube 14 to pass over the embankment 11 having its ingress end 17 and its egress end 18 disposed at a plane below the height of the embankment 11. It will be understood that it is not necessary that the tube be inflexible since a flexible tube may also be employed without violating the spirt of this invention.

On the ingress end 17 of the siphon tube 14 I provide a flow operable check valve indicated in general by the numeral 19 obviously the check valve may assume one of many constructions in its broadest scope such as a ball type or a flap valve. However, I have found it most convenient to provide a valve having a free swinging flap 20 which is hinged on a pin 21 extending at right angles to the axis of the siphon tube 14 that is at right angles to the flow of the water through the tube.

For ease in fitting the flap valve I provide a valve housing 22 which is welded at 23 or otherwise secured to the end of the tubing 14. It may also be an integral portion of the ingress end of the tubing 14 if desired.

Figure 3:
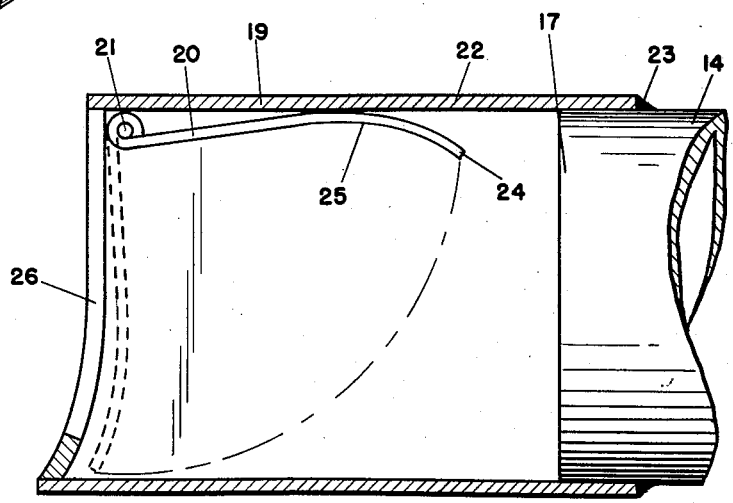
Figure 3 is a vertical, longitudinal cross section taken through the check valve and showing a fragmentary end portion of the siphon tube and upon a further enlarged scale.

It will be noted that the flap 20 at its free end 24 is provided with a curved or arcuate portion 25 shaped to dispose the end 24 in the flow of water passing through the siphon tube 14. While the water is flowing inwardly through the ingress end 17 of the tube and out the egress end 18 its flow causes the flap 20 to remain in the full line position of Figure 3 but should the water attempt to flow backward the flap 20 is moved by the flow of the water to the position wherein it seals with the valve seat 26 the flap being shown intermediate the sealing position and the open position by dotted lines of Figure 3.

It will be noted that the valve seat 26 is shaped to fit the configuration of the valve 20 so that the seal is tight to prevent back flow of fluid.

During siphoning operations this back flow is not a problem but it will be apparent that the check valve 19 is very desirable and effective in permitting the operator to fill the siphon 14 with water and thus prevent the conventional method of filling by immersion in the water 12 of the irrigation ditch 10.

The method of filling the tube is simply to immerse the ingress end 17 into the water 12 of the ditch and then rapidly and forcibly reciprocate the siphon tube 14 vertically so that the water is caused to open the flap valve 20 and pass into the tube on the downward movement thereof and during the upward movement the flap is caused to close and prevent the outward or back flow of the water therefrom. In essence the siphon operates similarly to the conventional piston type pump excepting the inward flow of water into the tube is caused by more rapid acceleration of the siphon tube in a downward movement than is possible for the water and therefore the water must flow upwardly into the tube. After the level of the water is raised sufficiently the tube is merely placed down over the embankment 11 so that the siphon action may commence.

Having thus described my invention I claim:

1. A portable irrigation siphon comprising a tube having a radius bend and reversed bend; a valve housing fixed on one end of said tube; a free swinging flow operable flap valve pivotally carried in said valve housing at one marginal edge thereof at right angles to the axis of said valve housing; said valve having a curved free end portion disposed to curve downwardly toward the central opening of the valve housing when disposed in its open position, whereby fluid attempting to flow outwardly through said valve housing will move said flap valve to its closed position; and a valve seat on the end of said valve housing shaped to cooperate with said flap valve to seal said tube against back flow.

2. The combination with a siphon tube of a fluid control valve at the intake end thereof comprising a tubular housing; a valve member hingedly associated with said housing and movable from a closed position substantially diametrically thereof to an open position substantially axially parallel thereto; said valve member being generally planar and having an end portion disposed out of the plane thereof; said end portion extending toward the axis of said housing when said valve member is in the open position, whereby flow of fluid therethrough in one direction necessarily effects movement of said valve member to the closed position; and a valve seat coextensive in shape for sealing engagement with said valve member when in the closed position.

References Cited in the file of this patent

UNITED STATES PATENTS

| | | |
|---|---|---|
| 103,564 | Catlin | May 31, 1870 |
| 330,078 | Wittram | Nov. 10, 1885 |
| 442,696 | Thompson | Dec. 16, 1890 |
| 1,000,719 | Cram | Aug. 15, 1911 |
| 1,187,683 | Vernon | June 20, 1916 |
| 1,463,658 | Parker | July 31, 1923 |
| 2,347,199 | Langdon | Apr. 25, 1944 |
| 2,435,049 | Christiansen | Jan. 27, 1948 |
| 2,553,253 | Hays | May 15, 1951 |

FOREIGN PATENTS

| | | |
|---|---|---|
| 59,245 | Germany | Oct. 12, 1891 |
| 468,601 | France | Apr. 28, 1914 |
| 749,642 | Great Britain | May 30, 1956 |